(12) United States Patent
Kesavan

(10) Patent No.: US 7,274,665 B2
(45) Date of Patent: Sep. 25, 2007

(54) PACKET STORM CONTROL

(75) Inventor: Vijay Sarathi Kesavan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1126 days.

(21) Appl. No.: 10/261,258

(22) Filed: Sep. 30, 2002

(65) Prior Publication Data

US 2004/0062200 A1    Apr. 1, 2004

(51) Int. Cl.
    *H04L 12/26* (2006.01)
(52) U.S. Cl. .................. 370/230.1; 370/232
(58) Field of Classification Search ........... 370/230, 370/230.1, 232, 233, 234
    See application file for complete search history.

(56) References Cited

U.S. PATENT DOCUMENTS

| | | | |
|---|---|---|---|
| 5,604,867 A * | 2/1997 | Harwood | 709/233 |
| 6,587,471 B1 * | 7/2003 | Bass et al. | 370/432 |
| 6,826,150 B1 * | 11/2004 | Bhattacharya et al. | 370/230 |
| 7,106,691 B1 * | 9/2006 | DeCaluwe et al. | 370/229 |
| 7,120,117 B1 * | 10/2006 | Liu et al. | 370/236 |
| 2005/0100020 A1 * | 5/2005 | Hata et al. | 370/395.21 |

* cited by examiner

*Primary Examiner*—Melvin Marcelo
(74) *Attorney, Agent, or Firm*—Pillsbury Winthrop Shaw Pittman LLP

(57) ABSTRACT

A system and method of packet storm control includes a storm control device configured to count designated packets and drop any such packets that are in excess of a threshold value per a specified time internal. The packet storm control system and method may be implemented with both ingress and egress designated packet traffic. A user may provide a maximum percentage of line speed for designated packet traffic, and the storm control device may determine an appropriate threshold value in response.

39 Claims, 7 Drawing Sheets

PACKET STORM CONTROL

BACKGROUND

1. Technical Field

The system and method described herein relate to packet storm control in a network.

2. Discussion of the Related Art

Computer networks provide a variety of means for transmitting electronic data packets. In conventional unicast networking, packets are transmitted via a network between two devices; each device having a particular network address. A one-to-one relationship is maintained between these two devices for the duration of a session. Broadcast networking operates similarly, insofar as packets are transferred directly from one device to another, yet rather than being transmitted to and received by only one device, broadcast packets are transmitted to and received by all devices on a network.

In multicast networking, network traffic does not travel from one device directly to another. Rather, packets are transmitted from a device to an address that is contained within a lookup table in a switching device, such as a router or switch. A multicast client situated on the network may notify the router that it desires to receive the multicast stream, and, when so informed, the router replicates the traffic and transmits it to that client, and to any other client that similarly joins the session. In this fashion, multiple devices situated on a network may receive particular multicast packets transmitted thereupon, yet other devices situated on the same network may not be in receipt of the same packets.

Excessive broadcast and multicast packets may be detrimental to network performance, because every device residing on the network may process each broadcast and multicast packet. In addition, if packets from a specific device or a specific group of device produce an excessive amount of packets, network performance may also be degraded. Also, destination unresolved unicast packets may degrade network performance. A destination unresolved unicast packet is a packet in which the destination address does not have an address in the lookup table, and thus the switching device does not know where to transmit the packet. The switching device receives the destination unresolved unicast packet and transmits it to devices residing on a virtual local area network with the switching device. If large numbers of devices are present on the VLAN, excessive packet traffic may occur and degrade network performance.

Additional processing overhead required by either broadcast packets, multicast packets, destination unresolved unicast packets or excessive packets from a device or group of devices may cause a device to deny services or drop incoming packets from other devices. This occurrence may be called a packet storm, e.g., a broadcast storm or a multicast storm.

Unlike unicast packets, multicast packets can be identified by an odd value in the first bit of the first byte of the destination Media Access Control ("MAC") address. Broadcast packets are identified as having all ones in the destination MAC address. If a device or group of devices are transmitting excessive packets, the packets can be identified by the originating/transmitting device address in the MAC address. By recognizing these distinctions among various packet types, a suppression system may be established to implement packet storm control.

DETAILED DESCRIPTION

A storm control apparatus or method may be implemented to reduce the likelihood of packet storms, e.g., broadcast storms, multicast storms or destination unresolved unicast storms. The storm control apparatus or method may limit the bandwidth that broadcast packet traffic, multicast packet traffic, a combination of other broadcast/multicast packet traffic, destination unresolved unicast traffic, or any designated packet traffic occupies, thereby reducing the stifling of regular unicast traffic. The storm control apparatus or method may be implemented when a device receives packets (ingress) or when a device transmits packets (egress). Although the storm control apparatus or method is described in terms of controlling broadcast traffic or multicast traffic, the device may be utilized to control any type of designated packet traffic to eliminate bandwidth bottlenecks. For example, if packets sent from a specific network address, i.e., device, or group of network addresses, i.e., devices, are stifling traffic within a packet switching device, a storm control apparatus or method may be utilized to reduce/minimize the effect of the packets sent from the designated device or group of designated devices. Thus, designated packets may include broadcast packets, multicast packets, a combination of broadcast or multicast packets, destination unresolved unicast packets, or other types of specifically designated packets. In this application, packets or frames may be used interchangeably, in that the storm control device may be counting the number of frames or packets.

Figure 1:
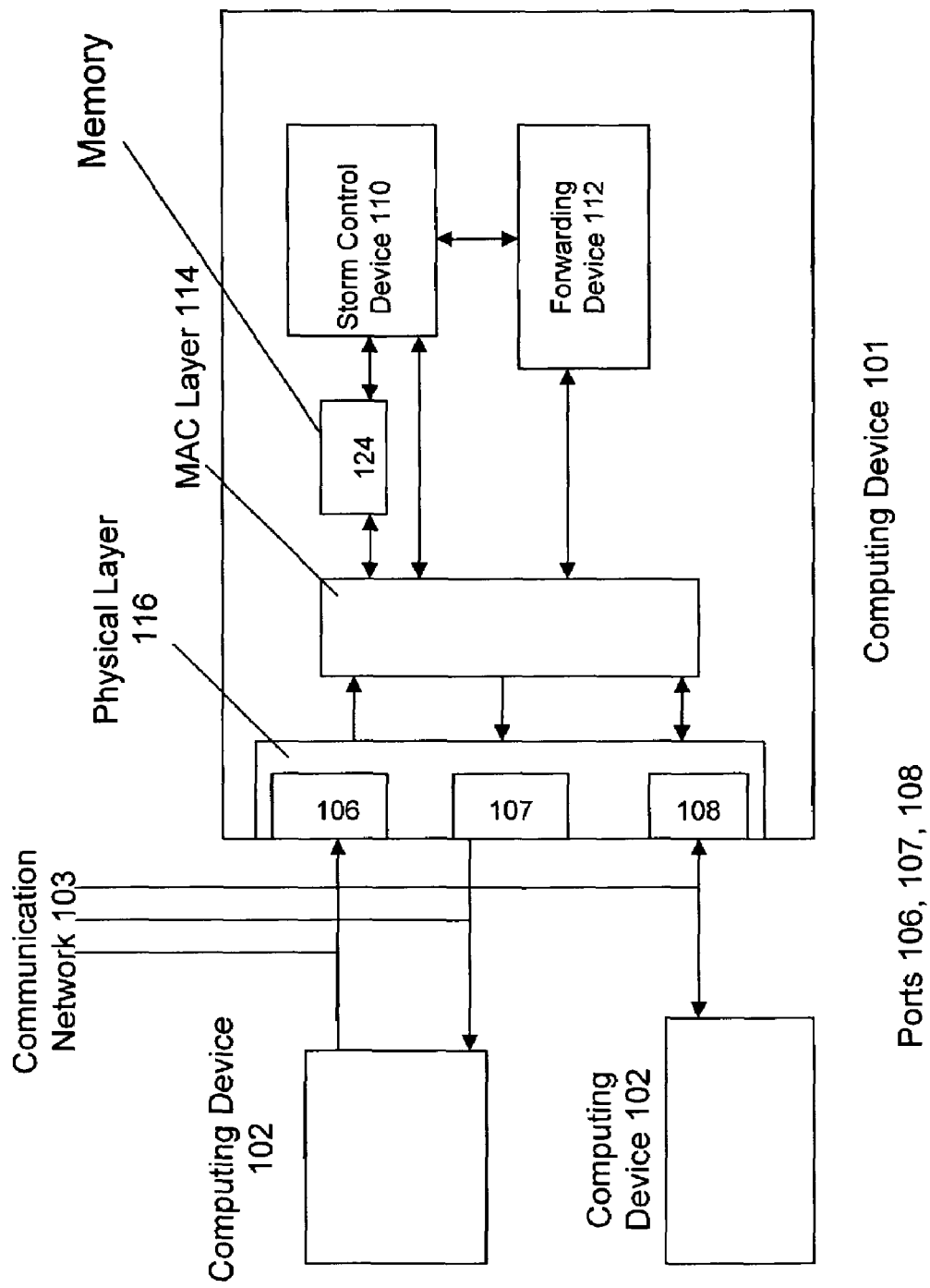
FIG. 1 illustrates a storm control device in a communications network according to an embodiment of the present technique.

FIG. 1 illustrates a storm control device in a communications network according to an embodiment of the present technique. As depicted in FIG. 1, a computing device 101 is in electronic communication with at least one other computing device 102 over a communications network 103. The computing device 101 may be a local area network switch, a router, or any other similar device transmitting or receiving packets over the communications network 103. The computing device 101 may include a storm control device 110, a forwarding device 112, a media access control (MAC) layer 114, a physical layer 116, at least one port 106, 107, 108, and a memory 124. The computing device 101 may receive packets over the communications network 103 via the at least one port 106, 107, and 108. The physical layer 116 may provide an interface for the at least one port 106, 107, 108 to the media access control layer 114.

The packets may be transmitted from the at least one port 106, 107, 108, through the physical layer 116 to the media access control layer 114. In one embodiment, the storm control device 110 may receive the packets from the media access control layer 114 and may decide, based on the number of designated packets (e.g., multicast packets, broadcast packets, destination unresolved unicast packets, or combination of multicast and broadcast packets) within the received packets, to drop the designated packets until a time interval expires. This may be referred to as ingress storm control. In one embodiment of the present invention, the remaining packets may be stored in a memory 124 before they are transferred to the storm control device 110 from the MAC layer 114. The remaining packets, i.e., packets not dropped by the storm control device 110, within the received packets may be forwarded to the forwarding device 112. The forwarding device 112 may decide which other computing device 102 will receive the remaining packets and may determine a selected port 106, 107 or 108 to which the remaining packets should be transmitted in order to be transmitted to the other computing device 102.

In an embodiment, the forwarding device 112 may first transmit the packets bound for a selected port 106, 107, and 108 through the storm control device 110. This may be referred to as egress storm control. In an alternative embodiment, the forwarding device 112 may transmit the packets bound for a selected port 106, 107, and 108 directly through the media access control layer 114 to the physical layer 116 to the selected port 106, 107 or 108. In the embodiment where the forwarding device 112 transmits the packets bound for a selected port 106, 107, or 108 through the storm control device 110 for egress storm control, the storm control device 110 may decide, as discussed previously, to drop some of the packets being sent to the selected port 106, 107, or 108 based upon the number of designated packets, e.g., broadcast packets, multicast packets, destination unresolved unicast packets, or combination or broadcast & multicast packets, within the transmitted packets. In this embodiment, the storm control device 110 may then transmit the remaining packets to the selected port 106, 107, or 108 through the media access control layer 114 and the physical layer 116.

The media access control layer 114, the forwarding device 112, and the storm control device 110 may be located on a single physical structure. Illustratively, the single physical structure may be an application specific integrated circuit (ASIC). The memory 124 may also be located on a single physical structure with the storm control device 110, the MAC layer 114, and the forwarding device 112. In an alternative embodiment, the MAC layer 114, the forwarding device 112, and the storm control device 110 may be located on two or three separate physical structures.

Figure 2:
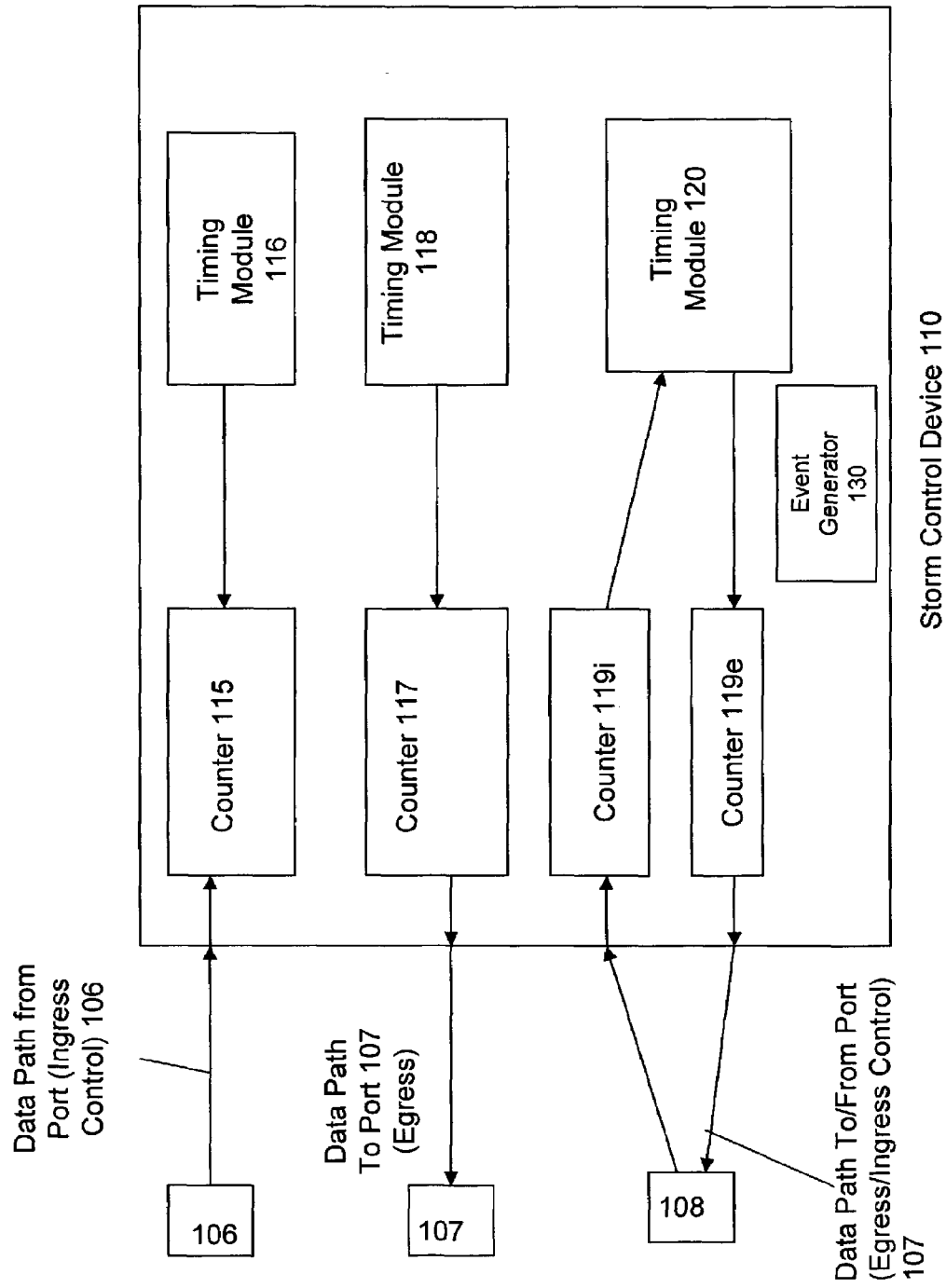
FIG. 2 illustrates a storm control device according to an embodiment of the storm control technique.

FIG. 2 illustrates a storm control device 110 according to an embodiment of the storm control technique. A single storm control device 110 may be configured to handle one or may be configured to handle multiple ports 106, 107 and 108. In an alternative embodiment, a plurality of storm control devices (not shown) may be included with each storm control device 110 controlling one of the multiple ports 106, 107, and 108. The storm control device 110 may be configured to monitor and react to both the receiving of packets (ingress) or the transmitting of packets (egress). Alternatively, one storm control device 110 may be configured to monitor and react to the incoming packets while a second storm control device (not shown) may be configured to monitor and react to the packets being transmitted, i.e., outgoing packets.

As depicted in FIG. 2, the ports 106, 107 and 108 interfacing with the storm control device 110 may include both incoming (e.g., 106) and outgoing (e.g., 107) ports; although an alternative embodiment may include one port or multiple ports (e.g., 108) configured as both an incoming and outgoing port. Designated packets, e.g., broadcast packets, multicast packets, destination unresolved unicast packets, or a combination of broadcast and multicast packets, contained in general data may be received or alternatively transmitted by each port 106, 107 and 108, depending upon whether the port is an incoming, outgoing, or bi-directional port. For example, if port 106 is an ingress port, the storm control device 110 may enable ingress storm control and monitor and react to any designated packets received into port 106 from the network. Illustratively, if port 107 is an egress port, the storm control device 110 may enable egress storm control and monitor and react to any packets being transmitted to port 107 which were transmitted from another port, for example port 106 or port 108 after going through the forwarding device 112.

In one embodiment, a separate threshold value, in terms of number of packets or frames, and a separate time interval may be input to the storm control device 110 for each port 106, 107 and 108, respectively. Alternatively, one threshold value may be input to a storm control device 110 and applied to all of the ports 106, 107, and 108. In another embodiment, one time interval may be input to the storm control device 110 and applied to all of the ports 106, 107, and 108. The threshold value(s) and time value(s) may be either input by a system user, may be stored in the memory 124 of the computing device 102, or may be stored in a memory (not shown) of the storm control device 110.

A plurality of counters 115, 117, 119*i*, and 119*e* may be further included with each port 106, 107, and 108 having a counter responsible for monitoring and reacting to packet flow, respectively, to determine the number of incoming or outgoing designated packets for the corresponding port 106, 107 and 108, respectively. The plurality of counters 115, 117, 119*i*, or 119*e* may only monitor one of the receipt or transmission of designated packets, and not both. Thus, if a port is utilized for both receipt (ingress) and transmission (egress), and ingress and egress storm control are both enabled, two counters 119*i* and 119*e* may be needed with one counter 119*i* counting either the number of or the byte count value of designated packets in the received packets and the other counter 119*e* counting either the number of or the byte count value of designated packets in the transmitted packets.

In one embodiment, a plurality of timing modules 116, 118 and 120 may be included to mark the passage of the separate time interval for each port 106, 107 and 108, respectively. In the embodiment where one time interval may be applied to all the ports 106, 107, and 108, one timing module (not shown) may be included to mark the passage of time for all the ports 106, 107, and 108. In an alternative embodiment of the present invention, a separate timing module (not shown) may be applied for ingress traffic from port 108 and a separate timing module (not shown) may be applied for egress traffic to port 108.

A separate threshold value may be input for each port 106, 107 and 108, respectively, during the associated time interval. In an alternative embodiment, one threshold value may be utilized for all of the ports 106, 107, and 108. Alternatively, if a port has both ingress and egress storm control enabled, an ingress threshold value may be set and a separate egress threshold value may be set.

During operation, the plurality of counters 115, 117,119$i$, and 119$e$ may determine whether the threshold value of designated packets, e.g., broadcast packets, multicast packets, destination unresolved unicast packets, or a combination of broadcast/multicast packets, has been exceeded in the packets received or, alternatively, transmitted in the configured time interval by each port 106, 107 and 108, respectively. Illustratively, storm control may be enabled for the receiving, i.e., ingress, of packets, the threshold value may be 70 designated packets, and the time interval may be one millisecond. Thus, in this example, if more than 70 designated packets are received and counted by the selected port before the time interval of one millisecond expires, any more designated packets received by the selected port may be dropped during the time interval of one millisecond. Once the time interval expires, i.e., one millisecond has elapsed, designated packets received by the selected port may be allowed to proceed through the storm control device 110. As discussed previously, multicast packets may be identified by an odd value in the first byte of the destination MAC address. Broadcast packets may be identified because they have a value of 1 in all bits of the destination MAC address. Other designated packets may be identified by the origination or sending address included in the packet. Destination unresolved unicast packets may have addresses which do not have a forwarding value in a lookup table.

In one embodiment, if a port is used to both receive and to transmit a packet, then an egress counter 119$e$ and an ingress counter 119$i$ may be utilized for one port 108, as illustrated in FIG. 2, to determine if the threshold value of designated packets has been exceeded in the transmitted packets (egress counter 119$e$) or the received packets (ingress counter 119$i$).

When the number of designated packets either received or, alternatively, transmitted by a particular port 106, 107 or 108 reaches the configured threshold value in the configured time interval, respectively, the storm control device 110 may drop the designated packets, e.g., broadcast, multicast, destination unresolved unicast packets, or a combination of broadcast and multicast packets, contained in general data for the remainder of the time interval identified for that particular port 106, 107 or 108. Once the time interval has expired for the associated port 106, 107 or 108, the storm control device 110 may again allow the receipt or, alternatively, transmittal of designated packets contained in general data for the associated port 106, 107 or 108.

In alternative embodiments of the present invention, different types of designated packet traffic, i.e., broadcast packet traffic, multicast packet traffic, destination unresolved unicast traffic, etc., may have separate threshold values, a separate counter, and a separate timing module. In an embodiment of the invention where different types of designated packet traffic has separate threshold values, counters and timing modules, a port 107 may have multiple threshold values applied to it, multiple counters (each controlling one type of designated packet traffic), and multiple timing modules, each controlling one type of designated packet traffic. For example, if a port 107 has egress control activated for both broadcast and multicast traffic, the port 107 may include two counters, with one for egress control of broadcast traffic and the other for egress control of multicast traffic. The port 107 may also include two timing modules with one for egress control of broadcast traffic and one for egress control of multicast traffic.

In another embodiment, a separate lower threshold value may also be established for each of the particular ports 106, 107, or 108 in addition to the original, i.e., higher threshold value. Alternatively, one lower threshold value may be established for all of the particular ports 106, 107, or 108. In another alternative embodiment, one lower threshold value may be established for ingress control on a particular port 106, 107, or 108 and a second lower threshold value may be established for egress control on the particular port 106, 107, or 108. The lower threshold value may be established by the user or may be automatically input to the storm control device 110, as discussed previously.

If during the immediately preceding time interval the upper threshold was exceeded, then during the time interval, i.e., the current time interval, the storm control device 110 may drop all designated packets, e.g., broadcast packets, multicast packets, destination unresolved unicast packets, or a combination of broadcast or multicast packets, for the current time interval. This may occur even though the original or higher threshold value was not exceeded in the current time interval. If the lower threshold was not exceeded during the current time interval, the storm control device 110 may allow designated packets to pass through without being dropped starting with the next time interval. If the lower threshold was exceeded during the current time interval, the storm control device may continue to drop all designated packets for the next time interval. This determination may be made for each succeeding time interval. This may prevent a constant cycle of dropping and not dropping packets when the number of designated packets or byte count value hovers near the upper threshold value. The storm control device 110 may continue to drop designated packets until the number of or the byte count value of the designated packets dropped during the time interval falls below the lower threshold value.

For example, if 32 designated packets were counted in the immediately preceding time interval, e.g., t1, the lower threshold value is 30 designated packets, and the upper threshold was exceeded in a prior time interval, e.g., t0, the storm control device 110 may continue to drop each designated packet in the current time interval, e.g., t2. The dropping of designated packets may continue to occur until a time interval occurs when less than 30 designated packets are counted during the time interval. Thus, if in the next time interval, e.g., t3, only 20 designated packets are counted, then in time interval t4 packets may no longer be dropped by the storm control device 110.

The storm control device 110 may also generate an event message when a specific event occurs. In one embodiment of the present invention, the event message may be an interrupt sent to the processor of the computing device 101. In an alternative embodiment of the present invention, the event message may be a Simple Network Management Protocol (SMNP) trap sent to a central device monitoring the communications network 103. An event generator 130 may generate one type of event message for a particular port 106, 107, or 108 if the threshold value is exceeded in the time interval but the threshold value was not exceeded in the immediately preceding time interval. The event generator 130 may generate a second type of event message for a particular port 106, 107, or 108, if the threshold value is not exceeded in the time interval but the threshold value was exceeded in the immediately preceding time interval.

Storm control may be also performed utilizing a threshold value based upon a number of byte count values of designated data, rather than a number of frames or packets, either transmitted from or received with general data by a computing device 102. In this embodiment, the plurality of counters 115, 117,119*i*, and 119*e* may increment once for each byte count value amount of designated data. The byte count value may be set to any appropriate value, although it generally ranges from 64 bytes to 1518 bytes. However, the byte count value may also be incremented by one byte. The byte count value for each port may have a default value of 64 bytes. For example, if 128 bytes are received by a port 106 and the byte count value is 64, the counter 115 associated with the port 106 may increment twice. A time interval may also be input for each port 106, 107, and 108, respectively, as described above. A timing module 116, 118 and 120 may further be included in the storm control device 110, for each port 106, 107, or 108, respectively, to mark the passage of the associated time interval for the associated port 106, 107, or 108.

For example, ingress storm control may be based on a number of segments, in this example 64-byte blocks, and the threshold value may be 20 64-byte segments. Segment size is configurable and may be 1, 64, 128, or 256-bytes in length. In this embodiment, the plurality of counters 115, 117, 119*i*, or 119*e* in the storm control device 110 may increment for each segment, i.e., 64-byte chunk of designated data, received on the selected port. Illustratively, if 1,280 bytes of designated data or 20 64-byte segments are counted by the one of the plurality of counters 115, 117, 119*i*, or 119*e*, then the remaining designated data for the associated time interval may be dropped by the storm control device.

The counter 115, 117, 119*i*, or 119*e* of the storm control device 110 may increment once for each byte count value of designated data (e.g., broadcast data, multicast data, destination unresolved unicast data, or a combination of broadcast and multicast data) contained in the general data received, or alternatively transmitted by each port 106, 107 and 108, respectively. When the counter 115, 117, 119*i*, or 119*e* reaches its configured threshold value in terms of byte count value during a time interval for a particular port 106, 107 and 108, respectively, the storm control device 110 may drop the designated data contained in the general data for the remainder of the time interval for that particular port 106, 107 or 108. Once the time interval has expired for that port 106, 107 or 108, the storm control device 110 may again allow the receipt or, alternatively, transmittal of designated data contained in general data for that port 106, 107 or 108.

Figure 3A:
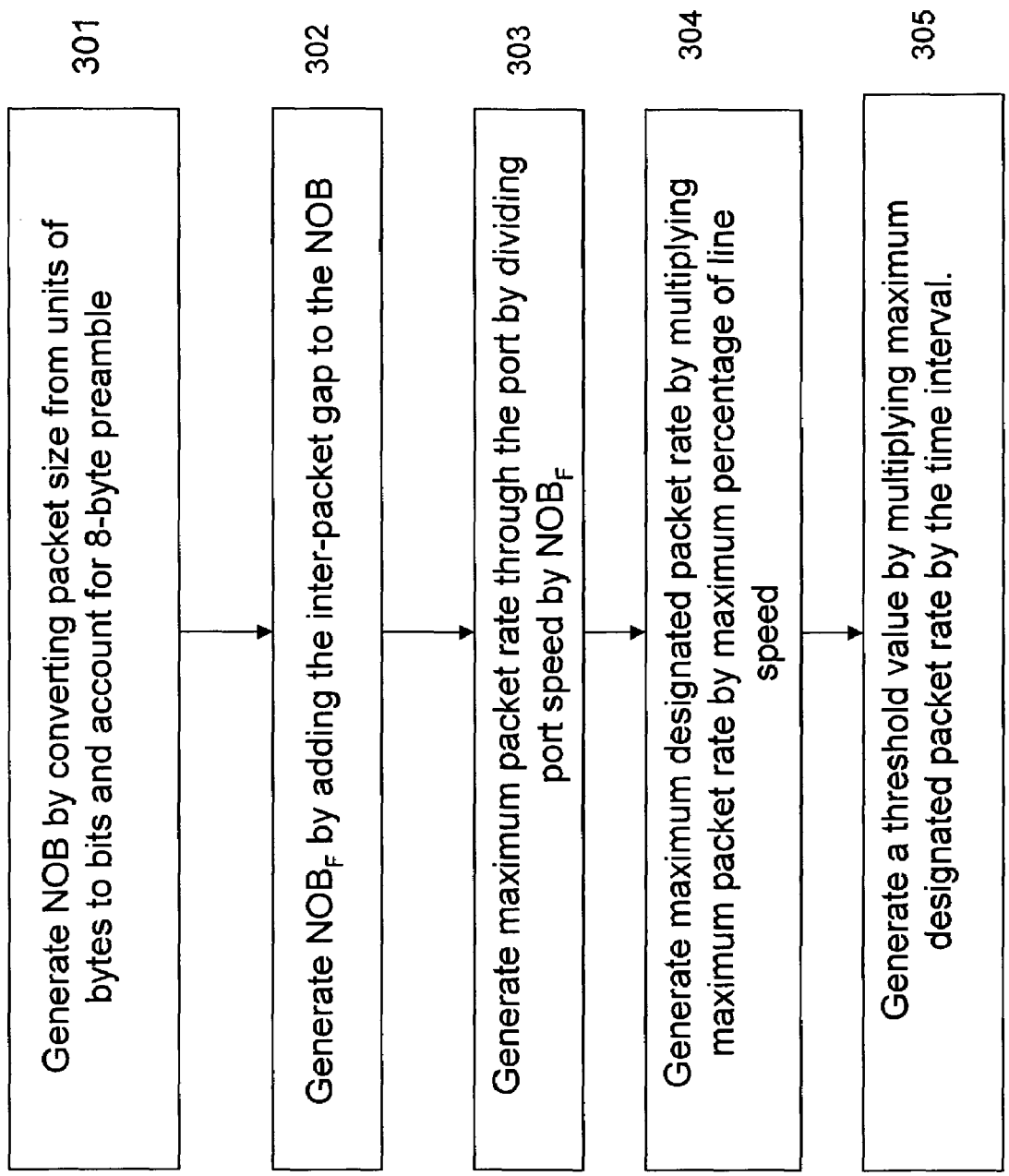
FIG. 3a illustrates a flowchart of an algorithm to determine a threshold value, in terms of a number of frames/packets when a percentage of line speed is entered, according to an embodiment of the storm control method and apparatus.

In many circumstances, inputting a number of packets or a number of bytes and a byte count value may not easily understood. Instead, a maximum percentage of line speed may be input as the threshold value, e.g., 15% of the receiving line speed, the receiving line speed being 10 Mbps. The storm control device may include an algorithm to convert the percentage of line speed threshold value to a number of packets/frames threshold value or a byte count value threshold value. FIG. 3*a* illustrates a flowchart of an algorithm to determine a threshold value, in terms of a number of frames/packets when a percentage of line speed is entered, according to an embodiment of the storm control method and apparatus. The implementation of this algorithm is below. This feature may impart a user-friendly aspect to the present invention; because maximum percentage of line speed is generally a value more easily understood and readily known by a user than is the maximum number of designated packets or a specific byte count of designated data for a particular port.

A maximum percentage of line speed for designated data, i.e., broadcast data, multicast data, destination unresolved unicast data, or a combination of broadcast and multicast data, may be input by a user (or otherwise set by the system), and this value may then be converted to a threshold value. The packet size of packets being transmitted from, or alternatively, received by the system and the time interval discussed above may also be input as well. The port or line characteristics (e.g., line speed, inter-packet gap, etc.) may also be recognized by the system, and are accounted for by implementation of the following algorithm, which converts the maximum percentage of line speed to a threshold value in terms of number of packets.

With reference to FIG. 3*a*, first, the packet size (i.e., generally ranging from 64 bytes to 1518 bytes) is converted 301 from byte units to a number of bits ("NOB"), i.e., 8 bits represent a byte. The 8-byte preamble is accounted for, and the units converted, as follows:

NOB=8(bits/byte)×(packet size+8 byte preamble)

Second, the inter-packet gap is added to the NOB, generating 302 a full interval NOB ("$NOB_F$"). The inter-packet gap is a function of line speed, and is combined with the NOB, as follows:

$NOB_F$=NOB +(Inter-packet gap)

Third, the line speed is divided 303 by the $NOB_F$ to generate the maximum packet rate through the port, as follows:

$$\text{packet rate}_{MAX} = \frac{\text{port speed (bits/sec)}}{NOB_F}$$

Fourth, the maximum designated packet rate is calculated 304 by multiplying the maximum packet rate of the port by the maximum percentage of line speed for designated data, as follows:

packet rate$_{B/M}$=packet rate$_{MAX}$(percentage line speed$_{B/M}$)

Finally, the threshold value is determined 305 by multiplying the time interval (the time interval has to be in seconds) with the maximum designated data rate, as follows:

threshold value=packet rate$_{B/M}$(time interval)

Figure 3B:
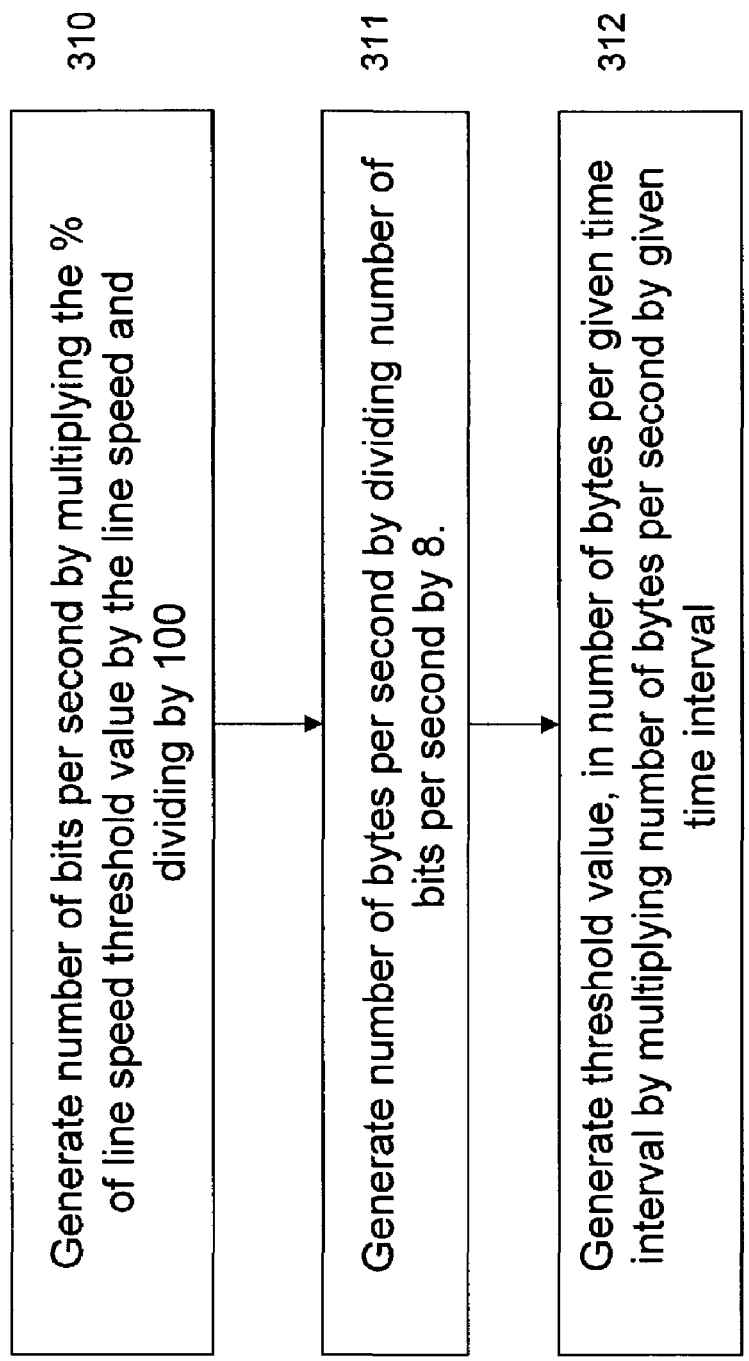
FIG. 3b illustrates a flowchart of an algorithm to determine a threshold value, in terms of bytes when a percentage of line speed is entered according to an embodiment of the present invention.

FIG. 3*b* illustrates a flowchart of an algorithm to determine a threshold value, in terms of bytes, when a percentage of line speed is entered as a threshold value according to an embodiment of the present invention. The number of bits per second may be generated 310 by multiplying the % of line speed threshold value by the line speed and dividing by 100. The number of bytes per second may be generated 311 by dividing the number of bits per second by eight. The threshold value in bytes for a given time interval may be calculated 312 by multiplying the given time interval by the number of bytes per second.

Figure 4:
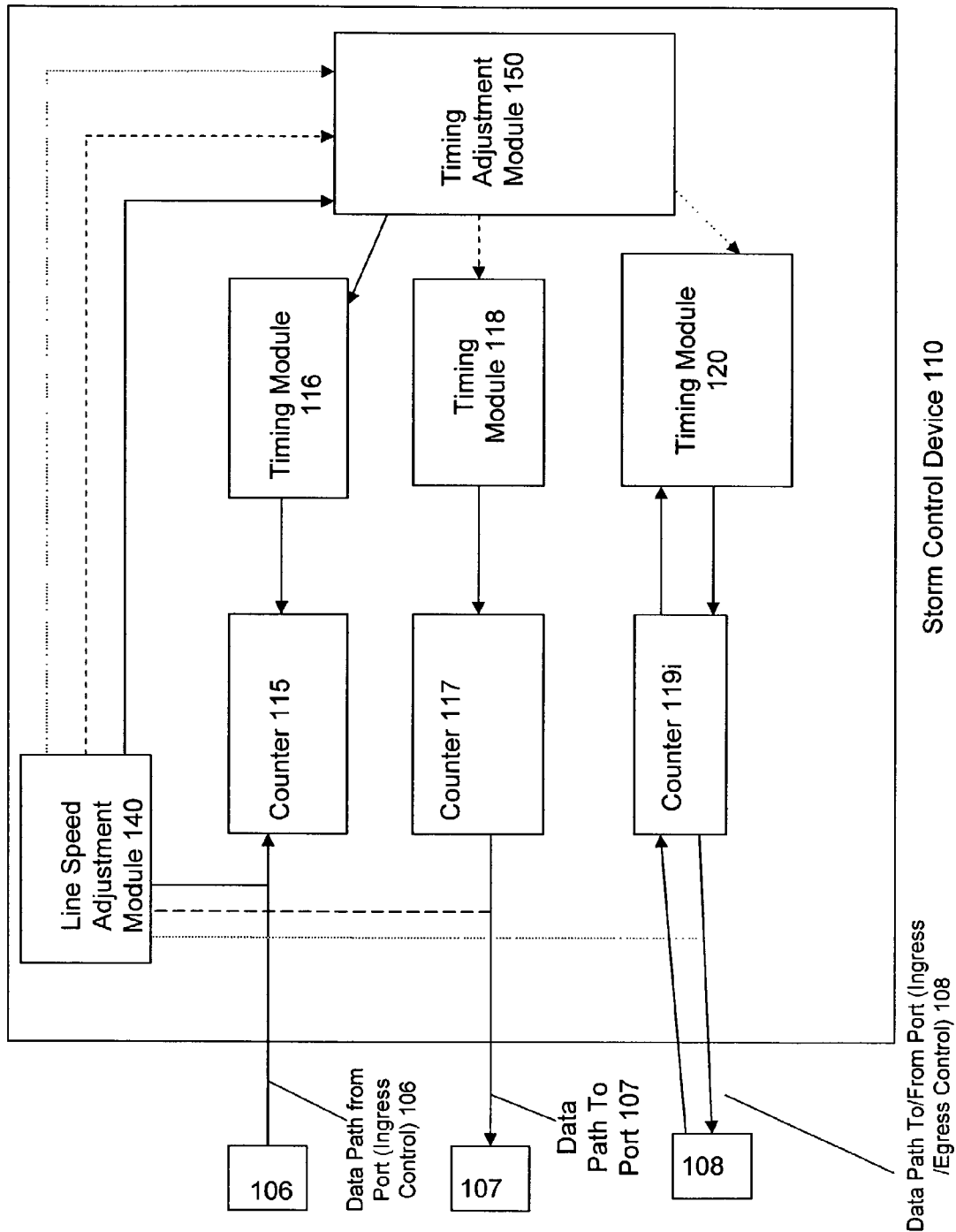
FIG. 4 illustrates the operation of line speed adjustment module and a timing adjustment module according to an embodiment of a storm control apparatus and method.

FIG. 4 illustrates the operation of line speed adjustment module and a timing adjustment module according to an embodiment of the storm control apparatus and method. In one embodiment, the timing interval may be modified according to a line speed entering of one of the ports 106, 107, or 108. A line speed adjustment module 140 may modify the line speed of a port in order for the port to receive information from a port on another computing device in an optimal manner. This may be referred to as auto-negotiation between the ports. The line speed adjustment module 140 may provide the adjusted line speed information to a timing adjustment module 150. In one embodiment, the timing adjustment module 150 may modify the time interval according to the adjusted line speed information and provide this information to one of the plurality of timing modules 116, 118, 120 established for one of the ports 106, 107, 108, respectively. If the threshold value remains the same, i.e., the same number of designated packets or the same number of byte count values, the time window may need to be scaled to compensate for the increased or decreased line speed. For example, if the time interval is 10 msec, the threshold value is 70 designated packets, and the line speed increases from 10 Mbps to 100 Mbps, the time interval may be decreased to 1 msec if the threshold value remains at 70 designated packets.

Figure 5:
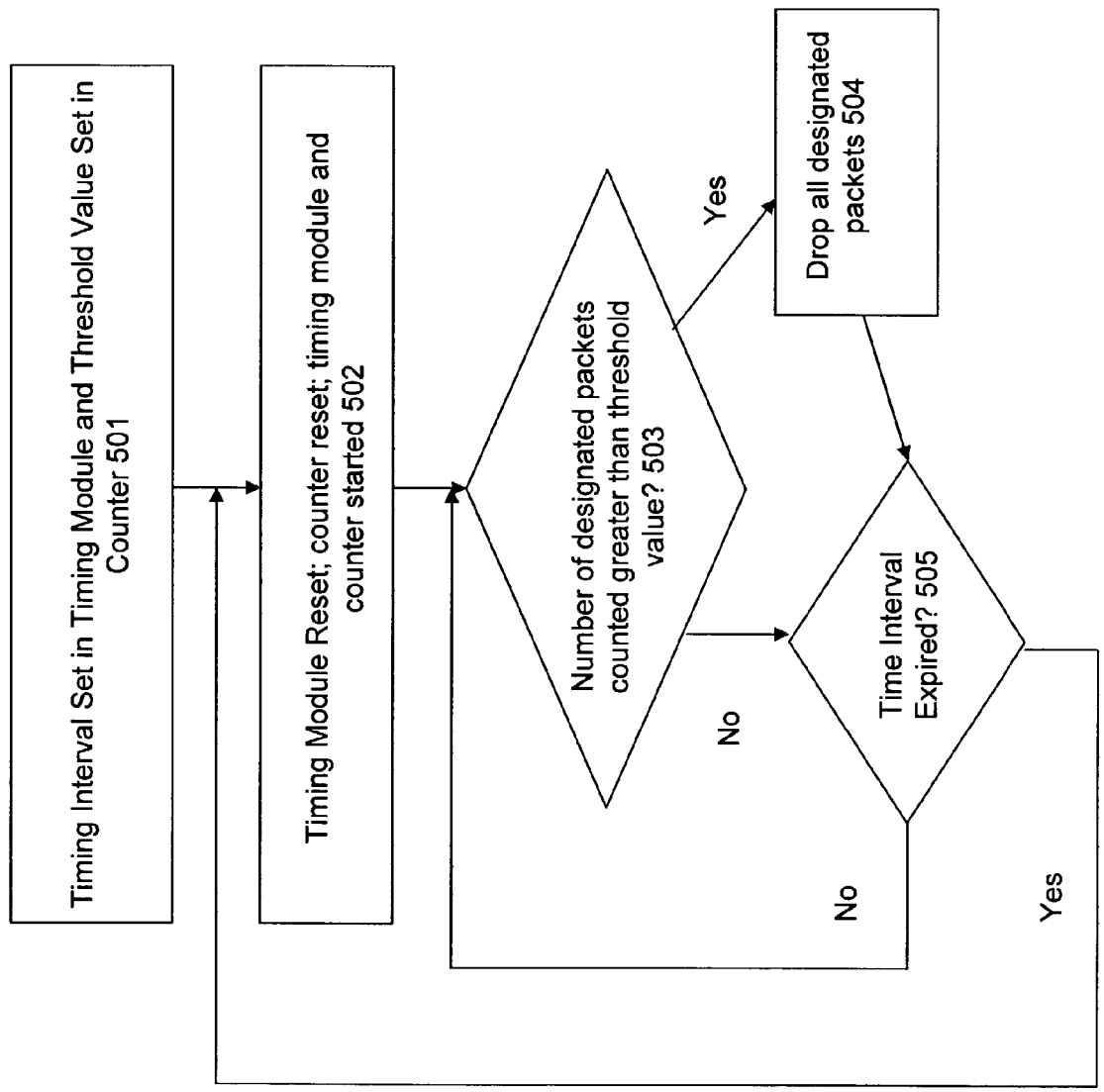
FIG. 5 illustrates a flowchart of the operation of an embodiment of storm control apparatus and method for one port.

FIG. 5 illustrates a flowchart of the operation of an embodiment of storm control apparatus and method for one port. A threshold value, and a time interval may be set 501 by the user for the port, as described above. Input of the threshold value may be performed indirectly by the user inputting a maximum packet count of designated packets, e.g., broadcast data, multicast data, destination unresolved unicast data, or the combination of broadcast/multicast data. A timing module and a counter may then be simultaneously started 502; the timing module marking the passage of the time interval, and the counter tallying either the number of packets that are either received by or transmitted towards the port. As described above, the counter is only counting either the received or the transmitted packets and not both. If the number of designated packets, e.g., broadcast packets, multicast packets, destination unresolved unicast packets, or the combination of broadcast & multicast packets, that are either received or transmitted by the port reaches the threshold value during a time interval (i.e., condition 503 is achieved), the storm control device drops 504 all designated packets until the time interval expires (i.e., condition 505 is achieved). If, however, the number of designated packets received, or alternatively transmitted by the port does not reach the threshold value (i.e., condition 503 is not achieved before condition 505 is achieved), then when the time interval expires (i.e., condition 505 is achieved), both the timing module and the counter are reset and restarted 502; and no broadcast data, multicast data, or combination of broadcast/multicast data has been dropped 504 by the storm control device.

Figure 6:
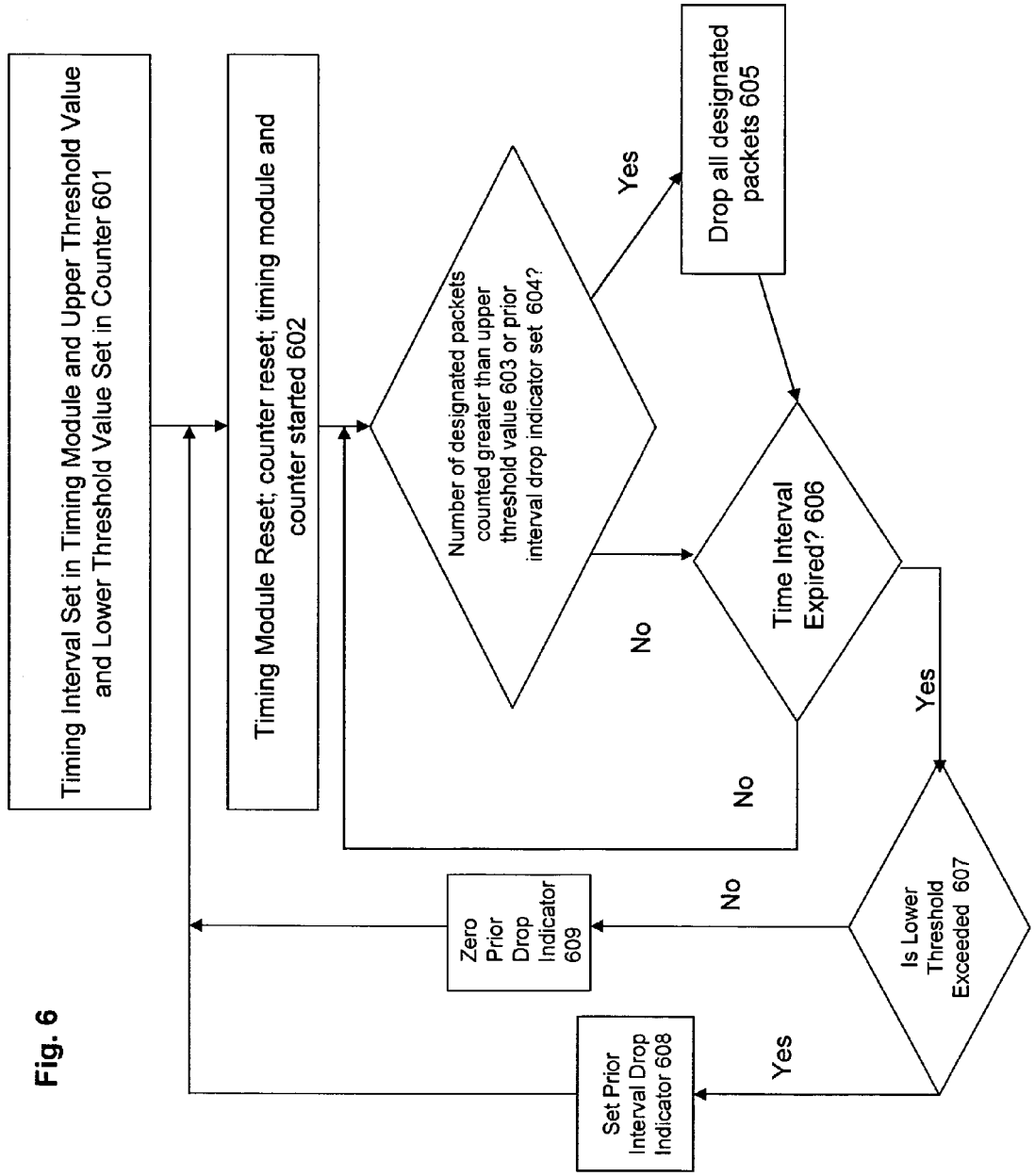
FIG. 6 illustrates an alternative operation of an embodiment of a storm control apparatus and method for one port.

FIG. 6 illustrates an alternative operation of an embodiment of a storm control apparatus and method for one port. An upper threshold value, a lower threshold value, and a time interval may be set 601 by the user for the port, as described above. Input of the upper threshold value and the lower threshold value may be performed as detailed above. A timing module and a counter may then be simultaneously started 602; the timer marking the passage of the time interval, and the counter tallying either the number of packets, frames, segments, or bytes that are received or alternatively transmitted by the port. As described above, the counter is only counting either the received or the transmitted packets and not both. If the number of designated packets, e.g., broadcast packets, multicast packets, destination unresolved unicast packets, or the combination of broadcast & multicast packets, that are received or, alternatively, transmitted by the port exceeds the upper threshold value during a time interval (i.e., condition 603 is achieved), or if a prior interval drop indicator was set in an immediately preceding timing interval (i.e., condition 604 is achieved), the storm control device will drop 605 all subsequent designated packets, until the time interval expires (i.e., condition 606 is achieved). After the time interval expires (i.e., condition 606 is achieved), if the lower threshold value was exceeded 607, the prior interval drop indicator is set 608 and both the timing module and counter are reset and restarted 602. If the lower threshold value is not exceeded 607 before condition 606 is achieved, then when the time interval expires (i.e., condition 606 is achieved), the prior interval drop indicator is zeroed out and both the timing module and the counter are reset and restarted 602.

For example, if the upper threshold value is 50 designated packets, the lower threshold value is 30 designated packets, and the number of designated packets received during a time interval t0 is 60, then the prior interval drop indicator may be set. For time interval t1 the number of designated packets counted may be 32 designated packets. In time interval t1 all designated packets may be dropped because the prior drop indicator has been set, condition 604. Because the lower threshold value has been exceeded, condition 607, the prior interval drop indicator remains set. In time interval t3, the number of designated packets counted may be 20 designated packets. In time interval t3, all designated packets may be dropped because the prior interval drop indicator was set. After the expiration of time interval t3, the storm control device may determine the lower threshold value was not exceeded for time interval t3 and may zero the prior interval drop indicator. Thus, in time interval t4, because the prior interval drop indicator has been zeroed, designated packet traffic may not be dropped unless the upper threshold value is exceeded.

While the description above refers to particular embodiments, it will be understood that many modifications may be made without departing from the spirit thereof The accompanying claims are intended to cover such modifications as would fall within the true scope and spirit of the storm control method and apparatus. The presently disclosed embodiments are therefore to be considered in all respects as illustrative and not restrictive, of the scope of the storm control method and apparatus being indicated by the appended claims, rather than the foregoing description, and all changes that come within the meaning and range of equivalency of the claims are therefore intended to be embraced therein.

What is claimed is:

1. A storm control device, comprising:
    a counter to tally a number of designated packets and a number of byte count values of designated data received during a time interval; and
    a timing module to mark passage of said time interval, wherein said storm control device halts receipt of designated packets when said number of designated packets reaches a threshold value during said time interval and halts receipt of said designated data when said number of byte count values reaches a threshold value during said time interval.

2. The storm control device of claim 1, wherein said designated packets are selected from one of a group of broadcast packets, multicast packets, destination unresolved unicast packets, and a combination of broadcast packets and multicast packets.

3. The storm control device of claim 1, wherein said counter and said timing module are reset to zero at completion of said time interval.

4. The storm control device of claim 1, further including logic allowing said storm control device to count destination unresolved packets as said designated packets.

5. A storm control device, comprising:
    a counter to tally a number of designated packets received during a time interval; and
    a timing module to mark passage of said time interval; and a timing adjustment module to scale said time interval based on a receiving line speed, wherein said storm control device halts receipt of designated packets when said number of designated packets reaches a threshold value during said time interval.

6. The storm control device of claim 1, further including logic to calculate said threshold value of designated packets from a specified maximum percentage of receiving line speed.

7. The storm control device of claim 5, further including an event generator to generate an event message when said threshold value is exceeded in said time interval but was not exceeded in an immediately preceding time interval, or if said threshold value was not exceeded in said time interval but was exceeded in said immediately preceding time interval.

8. The storm control device of claim 7, wherein said event message is an interrupt or a Simple Network Management Protocol trap.

9. A storm control device, comprising:
a counter to tally a number of designated packets transmitted during a time interval;
a timing module to mark passage of said time interval; and
a timing adjustment module to scale said time interval based on a transmitting line speed;
wherein said storm control device halts transmission of designated packets when said number of designated packets reaches a threshold value during said time interval.

10. The storm control device of claim 9, further including logic to calculate said threshold value of designated packets from a specified maximum percentage of transmitting line speed.

11. The storm control device of claim 9, further including an event generator to generate an even t message when a specified event occurs.

12. A system to control ingress of designated packets, comprising:
a port to receive data, said data including said designated packets; and
a storm control device, to receive said data from said port, including,
a counter to tally a number of designated packets and to tally a number of byte count values of designated data received by said port during a time interval; and
a timing module to mark passage of said time interval,
wherein said storm control device halts receipt of said designated packets when said number of designated packets reaches a threshold value during said time interval and halts receipt of said designated data when said number of byte count values reaches a threshold value during said time interval.

13. The system of claim 12, further including at least two ports, each of said at least two ports being either an ingress port, an egress port, or a combination ingress egress port.

14. The system of claim 13, further including a separate timing module for each of said at least two ports which measures a unique time interval for each of said at least two ports.

15. The system of claim 13, further including a separate counter for each of said at least two ports.

16. The system of claim 13, wherein each of said at least two ports could have a different threshold value.

17. The system of claim 13, further including two separate counters for any combination ingress egress port.

18. The system of claim 13, further including a forwarding device and a Media Access Control (MAC) layer, said MAC layer to assist to connect said storm control device and said forwarding device to each of said at least two ports.

19. The system of claim 18, wherein said storm control device, said forwarding device, and said MAC layer are located within a single physical device.

20. The system of claim 19, wherein a physical layer device interfaces the media access control layer to each of said at least two ports.

21. A system to control egress of designated packets, comprising:
a forwarding device to transmit data, said data including said designated packets; and
a storm control device to receive said data from said forwarding device, including,
a counter to tally a number of designated packets and byte count values of designated data transmitted from said forwarding device during a time interval; and
a timing module to mark passage of said time interval,
wherein said storm control device halts transmittal of said designated packets when said number of designated packets reaches a threshold value during said time interval and halts transmittal of said designated data when said byte count values of said designated data reaches a threshold value during said time interval.

22. The system of claim 21, further including at least two ports, wherein a separate timing module is established for each of said at least two ports.

23. The system of claim 21, further including at least two ports, wherein a separate counter is established for each of said at least two ports.

24. A method of preventing designated packet storms, comprising:
selecting a time interval for at least one port;
selecting a threshold value for said at least one port, said threshold value indicating a maximum number of designated packets received by said at least one port during said time interval;
counting a total number of designated packets received by said at least one port during said time interval;
halting passage of designated packets when said total number of designated packets reaches said threshold value for said at least one port prior to expiration of said time interval;
selecting a lower threshold value for said at least one port;
continuing to halt passage of designated packets in a new time interval when said designated packets were dropped in an immediately preceding time interval because said lower threshold value was exceeded in the new time interval.

25. The method of claim 24, further including allowing said designated packets to pass through said at least one port after said time interval has expired.

26. The method of claim 24, wherein selecting a threshold value in terms of number of designated packets for said at least one port, when a maximum percentage of receiving line speed for designated packets is input as said threshold value, includes,
specifying a packet size, converting said packet size to bits, converting an 8-byte preamble to bits, and adding the two together to generate a number of bits;
adding an inter-packet gap to said number of bits to generate a full interval number of bits;
dividing said receiving line speed of said at least one port by said full interval number of bits to generate a maximum packet rate;

multiplying said maximum packet rate by said maximum percentage of receiving line speed for said designated packets to generate a maximum designated packet rate; and multiplying said maximum designated packet rate by said time interval to generate said threshold value.

27. A method of preventing designated packet storms, comprising:

selecting a time interval for at least one port;

selecting a threshold value for said at least one port, said threshold value indicating a maximum number of byte count values of designated data received by said at least one port during said time interval;

counting a total number of byte count values of said designated data received by said at least one port during said time interval; and halting passage of said designated data when said total number of byte count values of said designated data reaches said threshold value for said at least one port prior to expiration of said time interval.

28. The method of claim 27, further including selecting a lower threshold value for said at least one port;

continuing to halt passage of designated data through said at least one port for a new time interval in which said designated data was dropped in an immediately preceding time interval because said lower threshold value was exceeded for the new time interval.

29. A method of preventing designated packet storms, comprising:

selecting a time interval for at least one port;

selecting a threshold value for said at least one port, said threshold value indicating a maximum number of designated packets to be transmitted to said at least one port from a forwarding device during said time interval;

counting a total number of designated packets transmitted from said forwarding device during said time interval;

halting passage of designated packets when said total number of designated packets reaches said threshold value for said at least one port prior to expiration of said time interval;

selecting a lower threshold value for said at least one port for a next time interval; and continuing to halt passage of said designated packets during said next time interval because said lower threshold value was exceeded during said next time interval.

30. A method of preventing designated packet storms, comprising:

selecting a time interval for at least one port;

selecting a threshold value for said at least one port, said threshold value indicating the maximum number of byte count values of designated data transmitted from a forwarding device to said at least one port during said time interval;

counting a total number of byte count values of said designated data transmitted by said forwarding device during said time interval that are directed to said at least one port; and halting passage of said designated data when said total number of byte count values of said designated data reaches said threshold value for said at least one port prior to expiration of said time interval.

31. The method of claim 30, further including, selecting a lower threshold for said at least one port; and continuing to halt passage of said designated data through said at least one port during a new time interval in which said designated data was dropped in an immediately preceding time interval because said lower threshold value was exceeded during the new time interval.

32. A program code storage device, comprising:

a computer-readable storage medium; and computer-readable program code, stored on the computer-readable storage medium, the computer-readable program code having instructions to:

select a time interval for at least one port;

select a threshold value for said at least one port, said threshold value indicating a maximum number of designated packets received by said at least one port during said time interval;

count a total number of designated packets received by said at least one port during said time interval;

halt passage of designated packets when said total number of designated packets reaches said threshold value for said at least one port prior to expiration of said time interval;

select a lower threshold value for said at least one port for a next time interval; and continue to halt passage of designated packets during the next time interval if said lower threshold value was exceeded in the next time interval.

33. The program code storage device of claim 32, further including allowing said designated packets to pass through to said at least one port after said time interval has expired.

34. The program code storage device of claim 32, wherein selecting a threshold value in terms of number of designated packets for said at least one port, when a maximum percentage of receiving line speed for designated packets is input as said threshold value, includes further instructions to:

specify a packet size, convert said packet size to a first set of bits, converting an 8-byte preamble to a second set of bits, and adding the first set of bits to the second set of bits to generate a number of bits, add an inter-packet gap to said number of bits to generate a full interval number of bits, divide a receiving line speed of said at least one port by said full interval number of bits to generate a maximum packet rate, multiply said maximum packet rate by said maximum percentage of receiving line speed for said designated packets to generate a maximum designated packet rate, and multiply said maximum designated packet rate by said time interval to generate said threshold value.

35. A program code storage device, comprising:

a computer-readable storage medium; and computer-readable program code, stored on the computer-readable storage medium, the computer-readable program code having instructions which when executed cause a computing device to:

select a time interval for at least one port;

select a threshold value for said at least one port, said threshold value indicating a maximum number of byte count values of designated data received by said at least one port during said time interval;

count a total number of byte count values of said designated data received by said at least one port during said time interval; and halt passage of said designated data when said total number of byte count values of said designated data reaches said threshold value of said at least one port prior to expiration of said time interval.

36. The program code storage device of claim 35, further including instructions, which when executed cause the computing device to
- select a lower threshold value for said at least one port for a next time interval; and
- continue to halt passage of said designated data during the next time interval because said lower threshold value was exceeded during the next time interval.

37. A program code storage device, comprising:
- a computer-readable storage medium; and
- computer-readable program code, stored on the computer-readable storage medium, the computer-readable program code having instructions, which when executed cause a computing device to:
- select a time interval for at least one port;
- select a threshold value for said at least one port, said threshold value indicating a maximum number of designated packets to be transmitted to said at least one port from a forwarding device during said time interval;
- count a total number of designated packets transmitted from said at least forwarding device during said time interval;
- halt passage of designated packets directed to said at least one port when said total number of designated packets reaches said threshold value for said at least one port prior to expiration of said time interval;
- select a lower threshold value for said at least one port for a next time interval; and
- continue to halt passage of designated packets during the next time interval because the lower threshold value was exceeded during the next time interval.

38. A program code storage device, comprising:
- a computer-readable storage medium; and
- computer-readable program code, stored on the computer-readable storage medium, the computer-readable program code having instructions, which when executed cause a computing device to:
- select a time interval for at least one port;
- selecting a threshold value for said at least one port, said threshold value indicating the maximum number of byte count values of designated data transmitted from a forwarding device to said at least one port during said time interval;
- count a total number of byte count values of said designated data transferred from said forwarding device during said time interval that are directed to said at least one port; and
- halt passage of said designated data directed to said at least one port when said total number of byte count values of said designated data reaches said threshold value for each of said at least one port prior to expiration of said time interval.

39. A program code storage device of claim 38, further including instructions, which when executed cause the computing device to:
- select a lower threshold for each of said at least one port for a next time interval; and
- continuing to halt passage of said designated data during said next time interval because said lower threshold was exceeded during said next time interval.

* * * * *